(12) United States Patent
Li

(10) Patent No.: US 12,525,833 B2
(45) Date of Patent: Jan. 13, 2026

(54) DISC MOTOR WITH HIGH TORQUE DENSITY

(71) Applicant: Zhongshan Broad-Ocean Motor Co., Ltd., Zhongshan (CN)

(72) Inventor: Mingjie Li, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 279 days.

(21) Appl. No.: 18/224,553

(22) Filed: Jul. 20, 2023

(65) Prior Publication Data

US 2024/0162770 A1    May 16, 2024

(30) Foreign Application Priority Data

Nov. 15, 2022  (CN) .......................... 202211420954.9

(51) Int. Cl.
*H02K 1/2795* (2022.01)
*H02K 1/28* (2006.01)

(52) U.S. Cl.
CPC ............. *H02K 1/2795* (2022.01); *H02K 1/28* (2013.01); *H02K 2213/03* (2013.01)

(58) Field of Classification Search
CPC ...... H02K 1/27; H02K 1/2713; H02K 1/2793; H02K 1/2795; H02K 1/28; H02K 16/02; H02K 16/04; H02K 21/026; H02K 2201/03

See application file for complete search history.

(56) References Cited

U.S. PATENT DOCUMENTS

2019/0103791 A1*  4/2019  Goel .................... H02K 1/2713

FOREIGN PATENT DOCUMENTS

| CN | 105914925 A | 8/2016 | |
|---|---|---|---|
| CN | 112564346 A | 3/2021 | |
| CN | 114189074 A * | 3/2022 | ............... H02K 1/27 |
| DE | 102020112423 A1 * | 11/2021 | ............ H02K 21/24 |
| EP | 3136565 B1 * | 8/2020 | ........... H02K 1/2795 |
| JP | H11220862 A | 8/1999 | |
| JP | 2003047186 A | 2/2003 | |

OTHER PUBLICATIONS

CN 114189074 A—Translation (Year: 2025).*
18224553_2025-06-20_DE_102020112423_A1_H.pdf (Year: 2025).*
18224553_2025-06-20_EP_3136565_B1_H.pdf (Year: 2025).*

* cited by examiner

*Primary Examiner* — Christopher M Koehler
*Assistant Examiner* — Ahmed F Seck
(74) *Attorney, Agent, or Firm* — MATTHIAS SCHOLL P.C.; Matthias Scholl

(57) ABSTRACT

A disc motor includes a stator assembly and a rotor assembly. The stator assembly is coupled to the rotor assembly through an axial magnetic field. The rotor assembly includes a rotor core, a first set of magnetic tiles, and a second set of magnetic tiles. The first set of magnetic tiles is disposed on the rotor core along a first circumference and magnetized axially. The second set of magnetic tiles is disposed on the rotor core along a second circumference and magnetized tangentially. The first set of magnetic tiles is disposed near the stator assembly, and the second set of magnetic tiles is disposed away from the stator assembly. The first set of magnetic tiles includes N first magnetic tiles disposed uniformly along the first circumference, and the second set of magnetic tiles includes N second magnetic tiles disposed uniformly along the second circumference, where N is an integer.

5 Claims, 11 Drawing Sheets

DISC MOTOR WITH HIGH TORQUE DENSITY

CROSS-REFERENCE TO RELAYED APPLICATIONS

Pursuant to 35 U.S.C. § 119 and the Paris Convention Treaty, this application claims foreign priority to Chinese Patent Application No. 202211420954.9 filed Nov. 15, 2022, the contents of which, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, MA 02142.

BACKGROUND

The disclosure relates to the field of electric motor technology, and more particularly, to a disc motor with high torque density.

Conventional axial flux disc motors feature high power density, light weight, and compact size. The rotor of the axial flux disc motors includes surface-mounted magnetic steels which are configured to generate axial magnetic field. However, the following disadvantages are associated with the motors: 1) to increase the magnetic flux density in the air gap, the thickness of the surface-mounted magnetic steels needs to be significantly increased, while this only leads to a marginal increase in the magnetic flux density in the air gap; 2) the motors have large inertia, while in some cases, the inertia needs to be kept in a certain range so as to acquire a large torque and radial dimension, which creates a conflict; 3) high-power axial flux motors have a large radial size, so the air gap between the stator and the rotor is limited; when the rotor rotates, it sways and easily rubs against the stator.

SUMMARY

To solve the aforesaid problems, the disclosure provides a disc motor with high torque density.

The disc motor comprises a stator assembly and a rotor assembly. The stator assembly is coupled to the rotor assembly through an axial magnetic field. The rotor assembly comprises a rotor core, a first set of magnetic tiles, and a second set of magnetic tiles. The first set of magnetic tiles is disposed on the rotor core along a first circumference and magnetized axially. The second set of magnetic tiles is disposed on the rotor core along a second circumference and magnetized tangentially. The first set of magnetic tiles is disposed near the stator assembly, and the second set of magnetic tiles is disposed away from the stator assembly. The first set of magnetic tiles is axially staggered with the second set of magnetic tiles at a distance of L3. The first set of magnetic tiles comprises N first magnetic tiles disposed uniformly along the first circumference, and the second set of magnetic tiles comprises N second magnetic tiles disposed uniformly along the second circumference, where N is an integer. A first centerline L1 is formed between every two adjacent first magnetic tiles, and each second magnetic tile comprises a second centerline L2. The first centerline L1 is offset from the second centerline L2 in the circumferential direction, which reduces an electrical angle difference between a first current angle corresponding to a maximum permanent magnet torque and a second current angle corresponding to a maximum reluctance torque, thereby increasing a maximum output torque of the disc motor.

In a class of this embodiment, the first centerline L1 is offset from the second centerline L2 in the circumferential direction by an offset angle α.

In a class of this embodiment, each first magnetic tile has a cross section in the shape of a sector, and each second magnetic tile has a square cross section.

In a class of this embodiment, the rotor core comprises a first annular end plate, a second annular end plate, a plurality of iron block portions, and a plurality of connecting portions. The plurality of connecting portions is disposed along the circumference between the first annular end plate and the second annular end plate to connect the first annular end plate and the second annular end plate together. A first mounting slot is formed between every two adjacent connecting portions. Each first magnetic tile is inserted into the corresponding first mounting slot. The plurality of the iron block portions are uniformly disposed and protrudes along the circumference from the bottom part of the second annular end plate. A second mounting slot is formed between every two adjacent iron block portions. Each second magnetic tile is inserted into the corresponding second mounting slot.

In a class of this embodiment, a first air-gap magnetic barrier is formed between each of the two sides of the first magnetic tile and the adjacent connecting portion; and second air-gap magnetic barrier is formed between each of the first magnetic tiles and a top of the second mounting slot.

In a class of this embodiment, each of the connecting portions comprises a through hole extending radially along the rotor core; and the through hole functions as a third air-gap magnetic barrier.

In a class of this embodiment, the first set of magnetic tiles comprises eight first magnetic tiles evenly disposed along the first circumference, and the second set of magnetic tiles comprises eight second magnetic tiles evenly disposed along the second circumference.

In a class of this embodiment, the offset angle α ranges between 6°-7°; and the electrical angle difference between the first current angle corresponding to the maximum permanent magnet torque and the second current angle corresponding to the maximum reluctance torque is between 7.5°-12.5°.

The following advantages are associated with the disc motor of the disclosure:

The disclosure provides a disk motor with high torque density. By offsetting the second magnetic tiles in the circumferential direction, an offset angle α is formed between the first centerline L1 and the second centerline L1, resulting in an asymmetric magnet distribution and a displaced d/q axis in the motor. As a result, the electrical angle difference between a first current angle corresponding to a maximum permanent magnet torque and a second current angle corresponding to a maximum reluctance torque is reduced, thereby making the maximum permanent magnet torque and the maximum reluctance torque approach each other. This allows for full utilization of the various torque components of the motor, leading to an improvement in the electromagnetic torque density of the motor output and ultimately increasing the torque density and power density of the motor.

Figure 1:
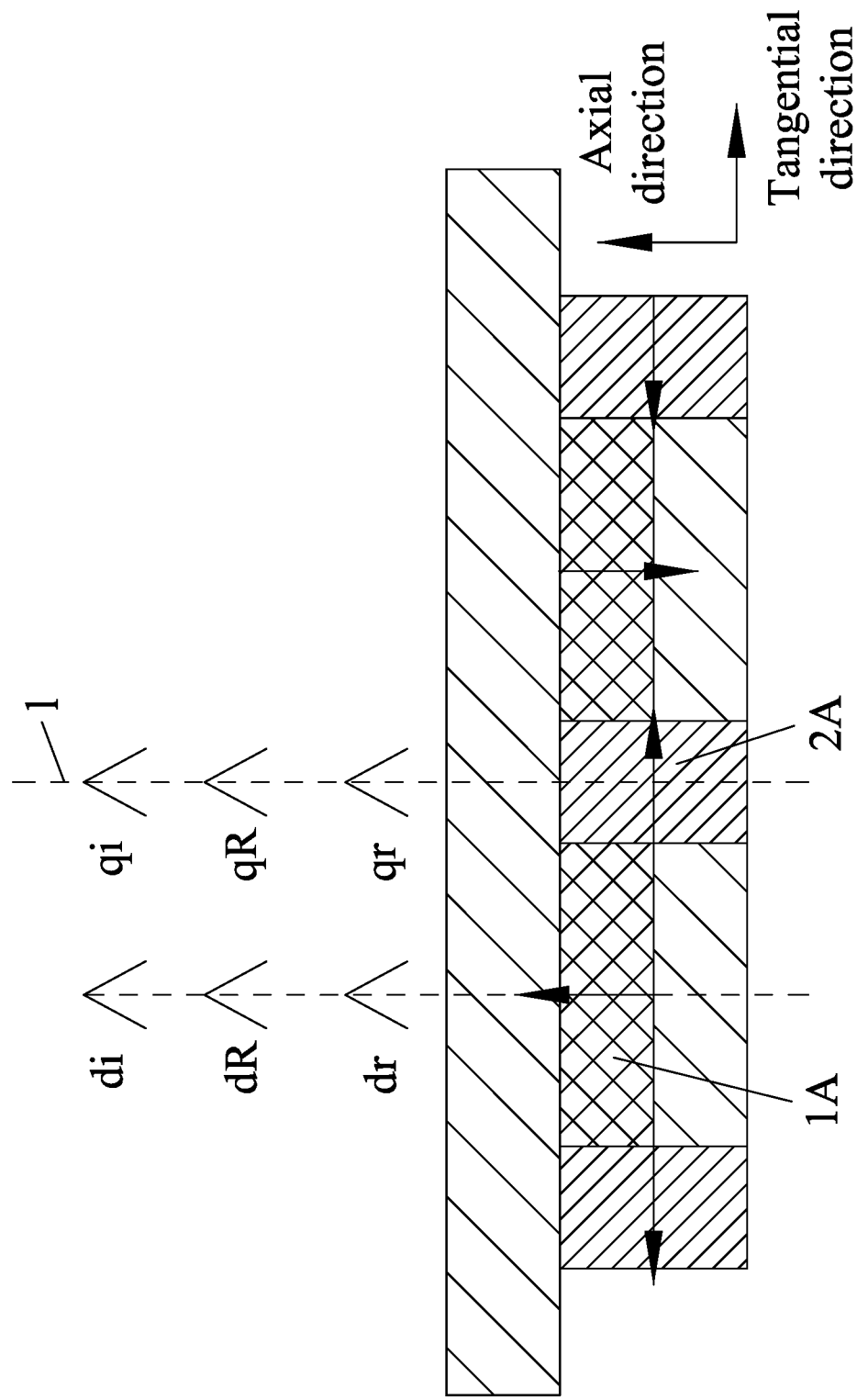
FIG. 1 is a schematic diagram showing the d- and q-axis of the axial-flux permanent-magnet synchronous motor with a symmetric distribution of magnetic tiles in the related art.

In the drawings, the following reference numbers are used: 1. Rotor core; 2. First set of magnetic tiles; 3. Second set of magnetic tiles; 4. First mounting slot; 5. Second mounting slot; 6. First air-gap magnetic barrier; 7. Second air-gap magnetic barrier; 8. Third air-gap magnetic barrier; 10. Stator assembly; 11. First annular end plate; 12. Second annular end plate; 13. Iron block portion; 14. Connecting portion; 20. Rotor assembly; 21. First magnetic tile; and 31. Second magnetic tile.

DETAILED DESCRIPTION

To further illustrate the disclosure, embodiments detailing a disc motor with high torque density are described below. It should be noted that the following embodiments are intended to describe and not to limit the disclosure.

Figure 2:
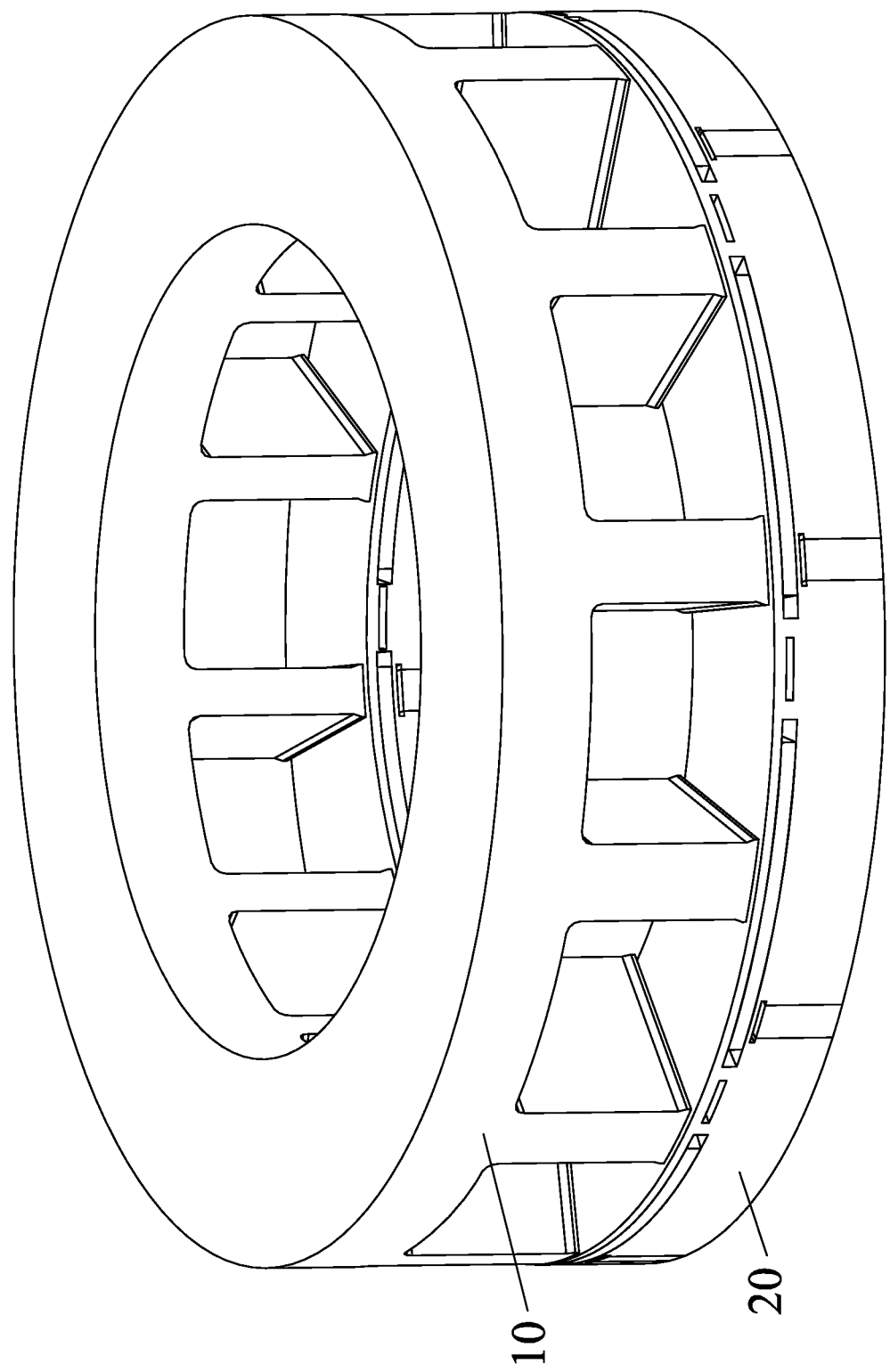
FIG. 2 is a perspective view of a stator assembly and a rotor assembly according to one example of the disclosure.
Figure 3:
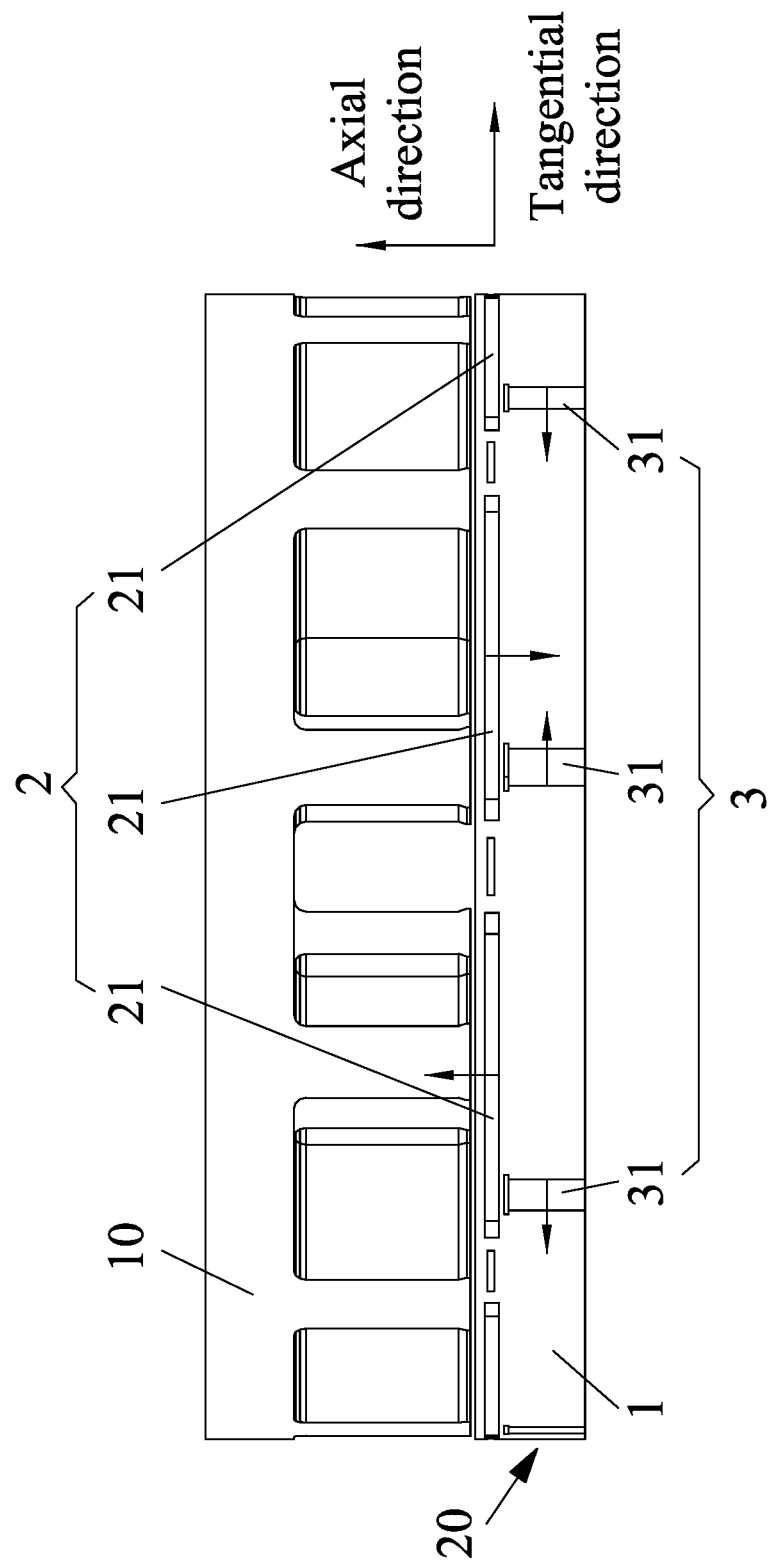
FIG. 3 is a front view of a stator assembly and a rotor assembly according to one example of the disclosure.
Figure 4:
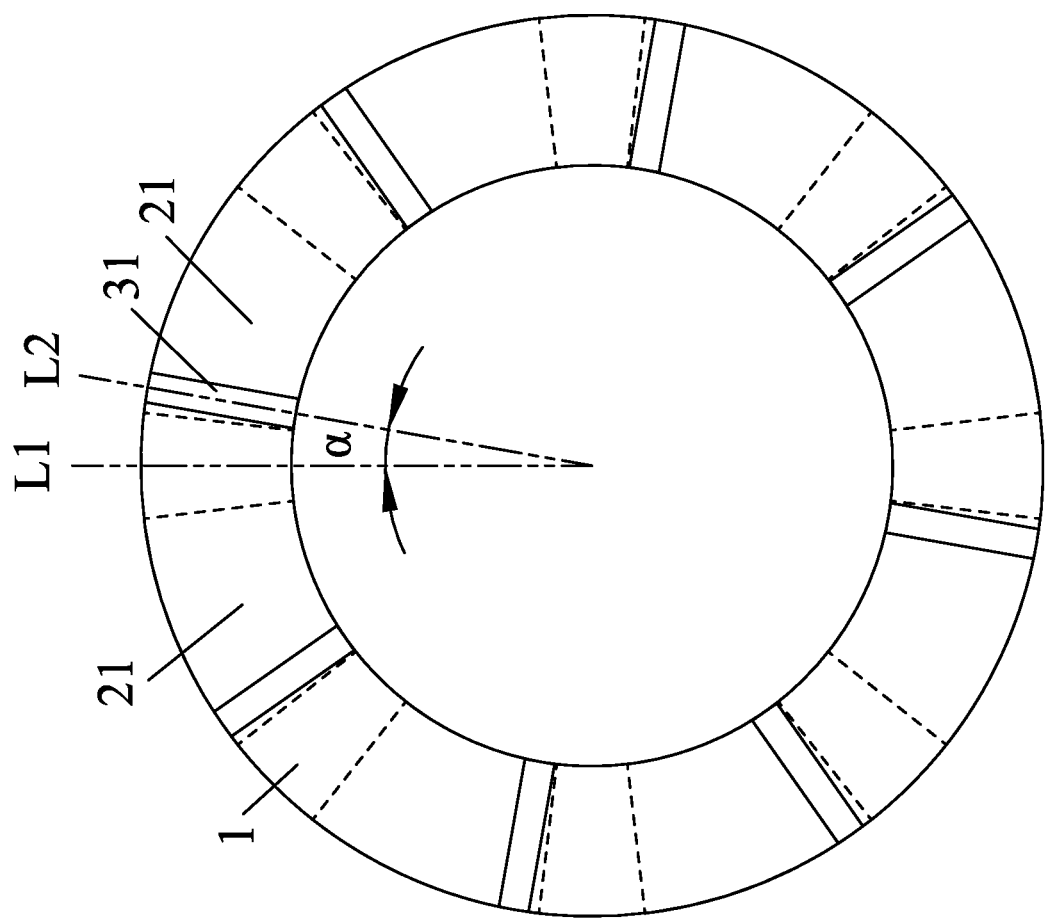
FIG. 4 is a schematic diagram showing the distribution of first magnetic tiles and second magnetic tiles according to one example of the disclosure.

As shown in FIGS. 2 to 4, the disclosure provides a disc motor with high torque density; the disc motor comprises a stator assembly 10 and a rotor assembly 20. The stator assembly 10 is coupled to the rotor assembly 20 through an axial magnetic field. The rotor assembly 20 comprises a rotor core 1, a first set of magnetic tiles 2, and a second set of magnetic tiles 3. The first set of magnetic tiles 2 is disposed on the rotor core 1 along a first circumference and magnetized axially. The second set of magnetic tiles 3 is disposed on the rotor core 1 along a second circumference and magnetized tangentially. The first set of magnetic tiles 2 is disposed near the stator assembly 10, and the second set of magnetic tiles 3 is disposed away from the stator assembly 10. The first set of magnetic tiles 2 is axially staggered with the second set of magnetic tiles 3 at a distance of L3. The first set of magnetic tiles 2 comprises N first magnetic tiles 21 disposed uniformly along the first circumference, and the second set of magnetic tiles 3 comprises N second magnetic tiles 31 disposed uniformly along the second circumference, where N is an integer. A first centerline L1 is formed between every two adjacent first magnetic tiles 21, and each second magnetic tile comprises a second centerline L2. The first centerline L1 is offset from the second centerline L2 in the circumferential direction by an offset angle α, which reduces the electrical angle difference between a first current angle corresponding to a maximum permanent magnet torque and a second current angle corresponding to a maximum reluctance torque, thereby increasing the maximum output torque of the motor. Specifically, the plurality of second magnetic tiles 31 is offset in the circumferential direction, so that the second centerline L2 is offset from the first centerline L1 by the offset angle α, which results in an asymmetric distribution of the magnetic tiles, causing the d/q axis of the motor to shift. This reduces the electrical angle difference between the first current angle corresponding to the maximum permanent magnet torque and the second current angle corresponding to the maximum reluctance torque, so that various torque components of the motor are fully utilized, which improves the electromagnetic torque density of the motor output, and thereby enhancing the torque density and power density of the motor.

Figure 9:
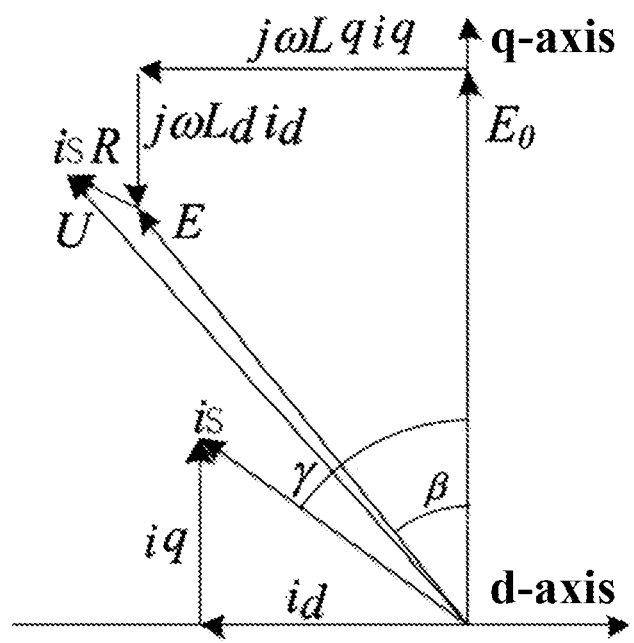
FIG. 9 is a diagram of a PARK transform vector of the motor according to one example of the disclosure.

When the magnetic tiles are disposed symmetrically, the plurality of second magnetic tiles 31 are not offset, thereby leading to lower torque density and power density of the motor. The specific operational procedure is as follows:

FIG. 9 is a diagram of the PARK transform vector of the motor.

The flux linkage equations in the d- and q-axis is expressed as follows:

$$\lambda d = Ld \times id + \lambda pm$$

$$\lambda q = Lq \times iq$$

λd and λq represent the d- and q-axis flux linkages, respectively; Ld and Lq represent d- and q-axis inductances, respectively; id and iq represent d- and q-axis currents, respectively; λpm represents the flux linkage of a permanent magnet.

Voltage equation is expressed as follows:

$$Vd = R \times id - \omega \times \lambda q + \frac{d(\lambda d)}{d(t)}$$

$$Vq = R \times iq - \omega \times \lambda d + \frac{d(\lambda q)}{d(t)}$$

Vd and Vq represent the components of the stator voltage along the d- and q-axis, respectively, R is the stator resistance per phase, ω is the angular velocity of the motor, and t is the time.

Equation for electromagnetic torque in motor:

$$T\_EM = \frac{3}{2} \times p(\lambda d \times iq - \lambda q \times id) = \frac{3}{2} \times p((Ld \times id + \lambda pm) \times iq - Lq \times iq \times id) =$$

$$\frac{3}{2} \times p(Ld \times id \times iq + \lambda pm \times iq - Lq \times iq \times id) =$$

$$\frac{3}{2} \times p \times \lambda pm \times iq + \frac{3}{2} \times p \times iq \times id(Ld - Lq)$$

T_EM is the total electromagnetic torque of the motor, P is the number of poles in an axial flux motor.

The equation for electromagnetic torque in motor can also be expressed as:

$$T\_EM = T\_PM + T\_RE$$

where, T_PM is the component of the torque on a permanent magnet; T_RE is the component of the reluctance torque.

$$T\_PM = \frac{3}{2} \times p \times \lambda pm \times iq$$

$$T\_RE = \frac{3}{2} \times p \times iq \times id(Ld - Lq)$$

where, T_PM is the component of the torque on the permanent magnet; T_RE is the component of the reluctance torque; T_PM and T_RE are donated as:

$$T\_PM = \frac{3}{2} \times p \times \lambda pm \times iq$$

$$T\_RE = \frac{3}{2} \times p \times iq \times id(Ld - Lq)$$

T_PM and T_RE can also be donated as:

$$T\_PM = \frac{3}{2} \times p \times \lambda pm \times is \times \cos\gamma$$

$$T\_RE = \frac{3}{2} \times p \times (Ld - Lq) \times \sin(2\gamma)$$

where, $\gamma$ is the current angle.

Figure 10:
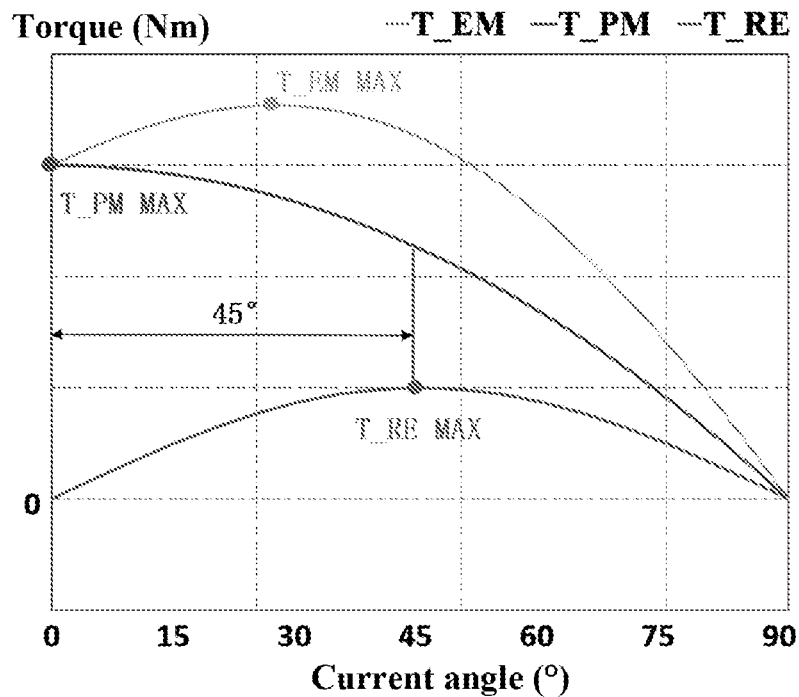
FIG. 10 is a torque component diagram of second magnetic tiles without offset according to one example of the disclosure.

According to the equations above, a synthesis diagram for electromagnetic torque can be plotted when the magnetic tile is not offset, as shown in FIG. 10. Based on the equation, the maximum value for the torque T_PM on the permanent magnet occurs at $\gamma=0°$, while the maximum value for the reluctance torque T_RE occurs at $\gamma=45°$. Therefore, there is a 45° electrical angle difference between the current angles corresponding to the maximum values of the permanent magnet torque and the reluctance torque. Due to the significant electrical angle difference, the components of the permanent magnet torque and reluctance torque cannot be fully utilized, leading to lower torque density and power density of the motor.

However, in this example, when the second magnetic tiles 31 are offset, the magnetic tile becomes asymmetric distribution, causing the main magnetic flux path to shift from a symmetric topology structure to an asymmetric topology structure. As a result, the d- and q-axis is offset from the original axis, as shown in FIG. 8.

Figure 8:
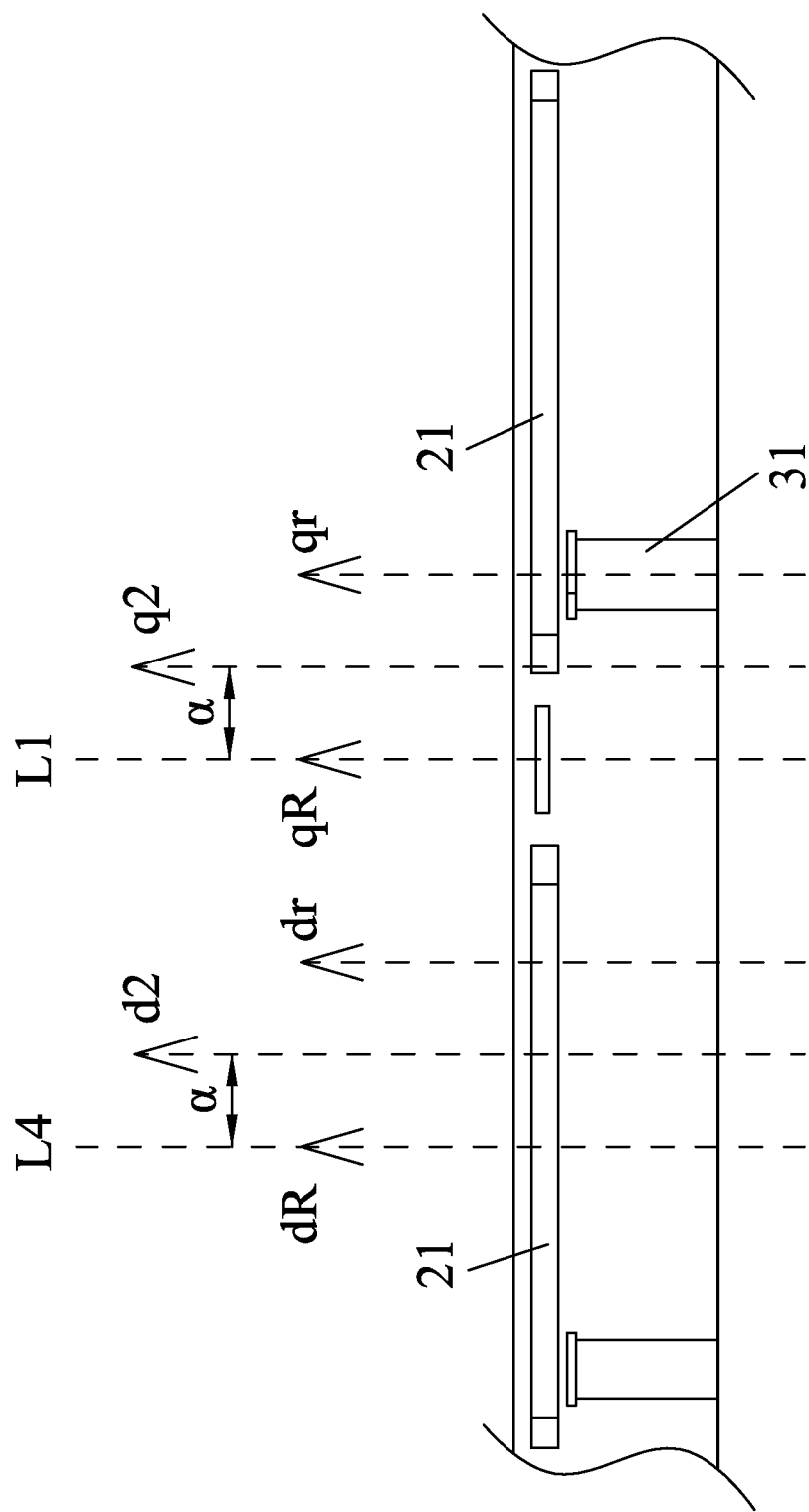
FIG. 8 is a schematic diagram showing the d- and q-axis of the axial-flux permanent-magnet synchronous motor with an asymmetric distribution of magnetic tiles of the disclosure.

After accounting for the offset of the second magnetic tiles 31, the axial flux motor in FIG. 8 exhibits different projection components of the d/q axis depending on which magnetic tile is assumed to be present. When considering only the first magnetic tile 21, the projection components are dR and qR, which coincide with a third centerline L4 of the first magnetic tile 21 and the first centerline L1 of every two adjacent first magnetic tiles 21, respectively; these projection components remain the same as they were before the offset of second magnetic tile 31. However, when considering only the second magnetic tile 31, the projection components are dr and qr, which no longer coincide with the third centerline L4 and the first centerline L1. When both the first magnetic tile 21 and the second magnetic tile 31 are present in the axial flux motor, the composite values of d2 (equal to the sum of dR and dr) and q2 (equal to the sum of qR and qr) in FIG. 8 represent the position of the d/q axis. However, after synthesis, d2 and q2 no longer coincide with the third centerline L4 and the first centerline L1, but instead result in a certain amount of angular deviation $\alpha$.

The angular deviation $\alpha$ is the actual deviation of the d/q axis; and the electrical angle offset $\alpha e$ can be expressed as:

$$\alpha e = \alpha \times \frac{p}{2}$$

where, p is the number of poles on the motor.

The formula for the component of the torque after the offset of the second magnetic tile 31 can be expressed as:

$$T\_PM = \frac{3}{2} \times p \times \lambda pm \times is \times \cos(\gamma - \alpha e)$$

$$T\_RE = \frac{3}{2} \times p \times (Ld - Lq) \times \sin(2(\gamma - \alpha e))$$

By substituting the electrical angle offset $\alpha e$, the formula for the component of the torque after the offset can be simplified:

$$T\_PM = \frac{3}{2} \times p \times \lambda pm \times is \times \cos\left(\gamma - \alpha \times \frac{p}{2}\right)$$

$$T\_RE = \frac{3}{2} \times p \times (Ld - Lq) \times \sin\left(2\left(\gamma - \alpha \times \frac{p}{2}\right)\right)$$

Figure 11:
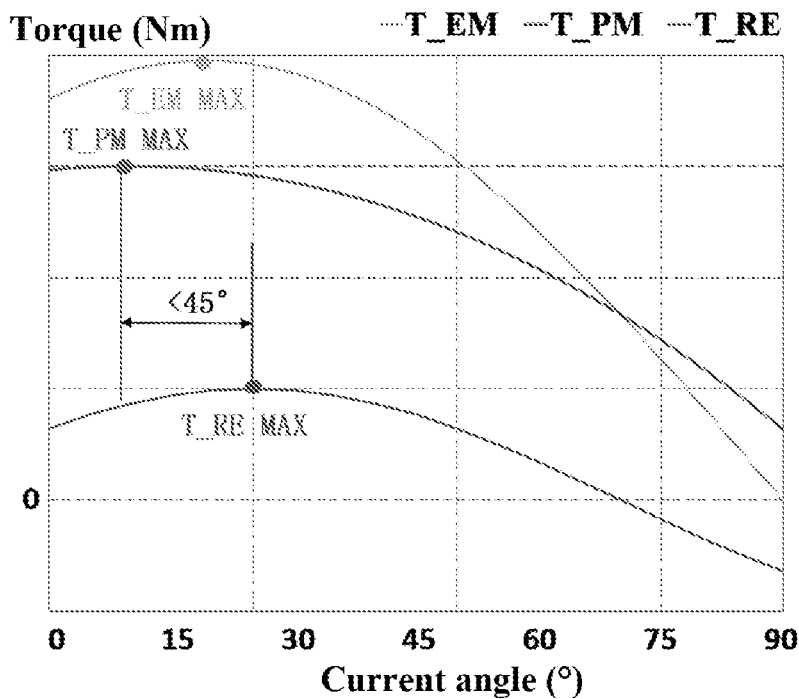
FIG. 11 is a torque component diagram of second magnetic tiles with offset according to one example of the disclosure.

When compared to the original formula of the second magnetic tile 31 without offset, it is evident that both the permanent magnet torque and the reluctance torque have undergone changes on the original basis. The phase difference caused by the offset of the second magnetic tile 31 makes the current angles of the maximum values of the permanent magnet torque and the reluctance torque approach each other, as illustrated in FIG. 11.

The offset angle $\alpha$, which is formed by the offset of the second centerline L2 and the first centerline L1 in the circumferential direction, can be determined through simulation, experiment, or mathematical modeling. For instance, to experimentally determine the offset angle $\alpha$, the following method is adopted: the current angle of the rotor assembly 20 is set as the reference when the component of the torque on the permanent magnet reaches the maximum value T_PM MAX; several offset angles $\alpha$ are set, such as 0.5°, 1°, 1.5°, 2°, and so on; each offset angle $\alpha$ was tested; and the current angle corresponding to the maximum value T_RE MAX for the component of the reluctance torque was measured. If there is a less than 45° electrical angle difference between the current angles corresponding to the maximum values of the permanent magnet torque and the reluctance torque, the tested offset angle $\alpha$ is considered a preferred angle. After multiple tests, when the electrical angle difference reaches the smallest, the tested offset angle $\alpha$ is considered the optimal angle of the second centerline L2 offset from the first centerline L1 in the circumferential direction.

Understandably, to calculate the offset angle $\alpha$ of the second centerline L2 offset from the first centerline L1 in the circumferential direction through simulation and experimental calculations, it is necessary to determine various parameters such as the number of stator slots, number of poles, inner and outer diameters of the motor, height of the stator core, height of the rotor core, thickness of the first magnetic tile 21, pole-arc coefficient of the first magnetic tile 21, and thickness of second magnetic tile 31.

Furthermore, the first magnetic tile 21 has a cross section in the shape of a sector, while the second magnetic tile 31 has a square cross section.

Figure 5:
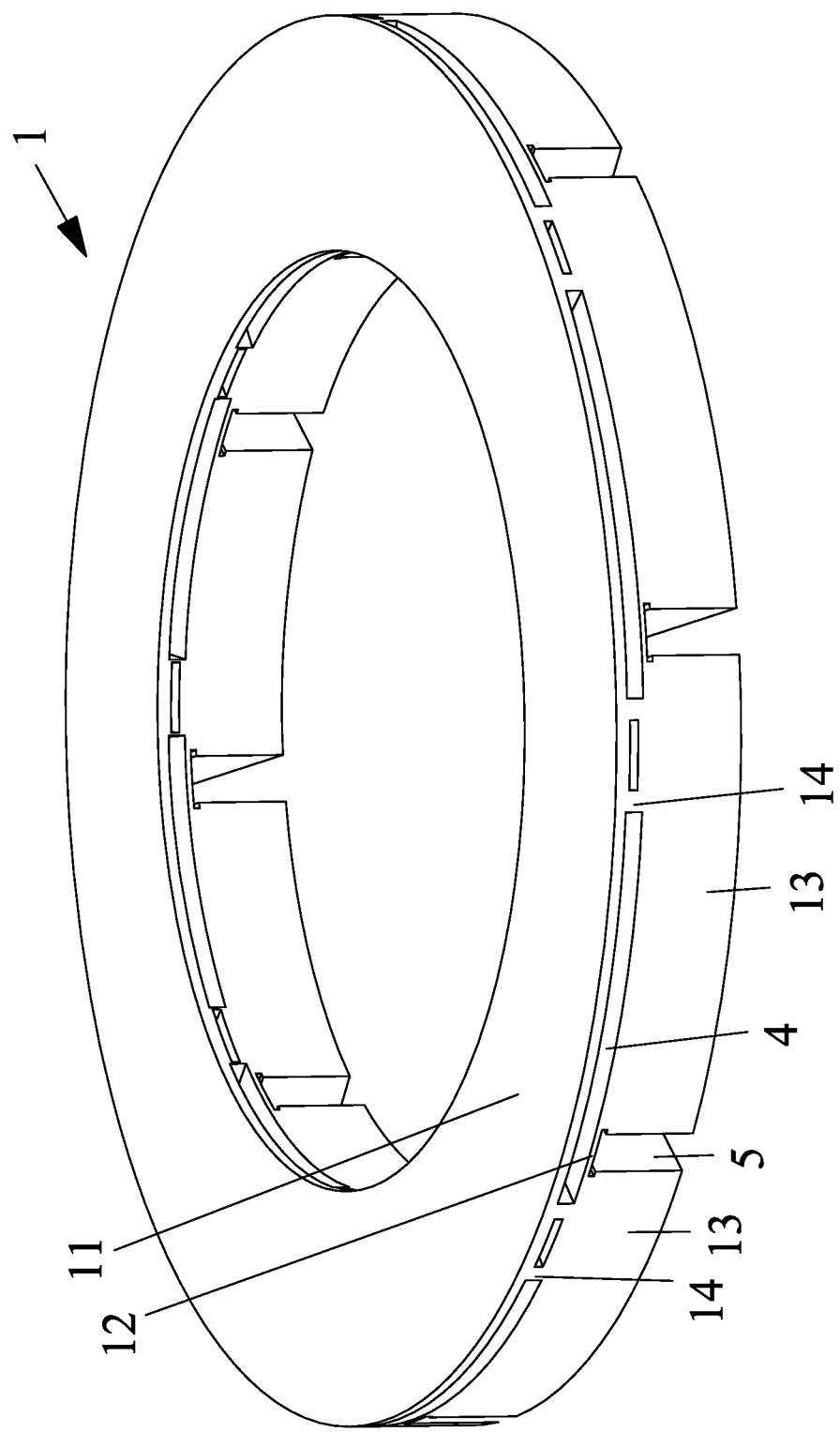
FIG. 5 is a perspective view of a rotor core according to one example of the disclosure.
Figure 6:
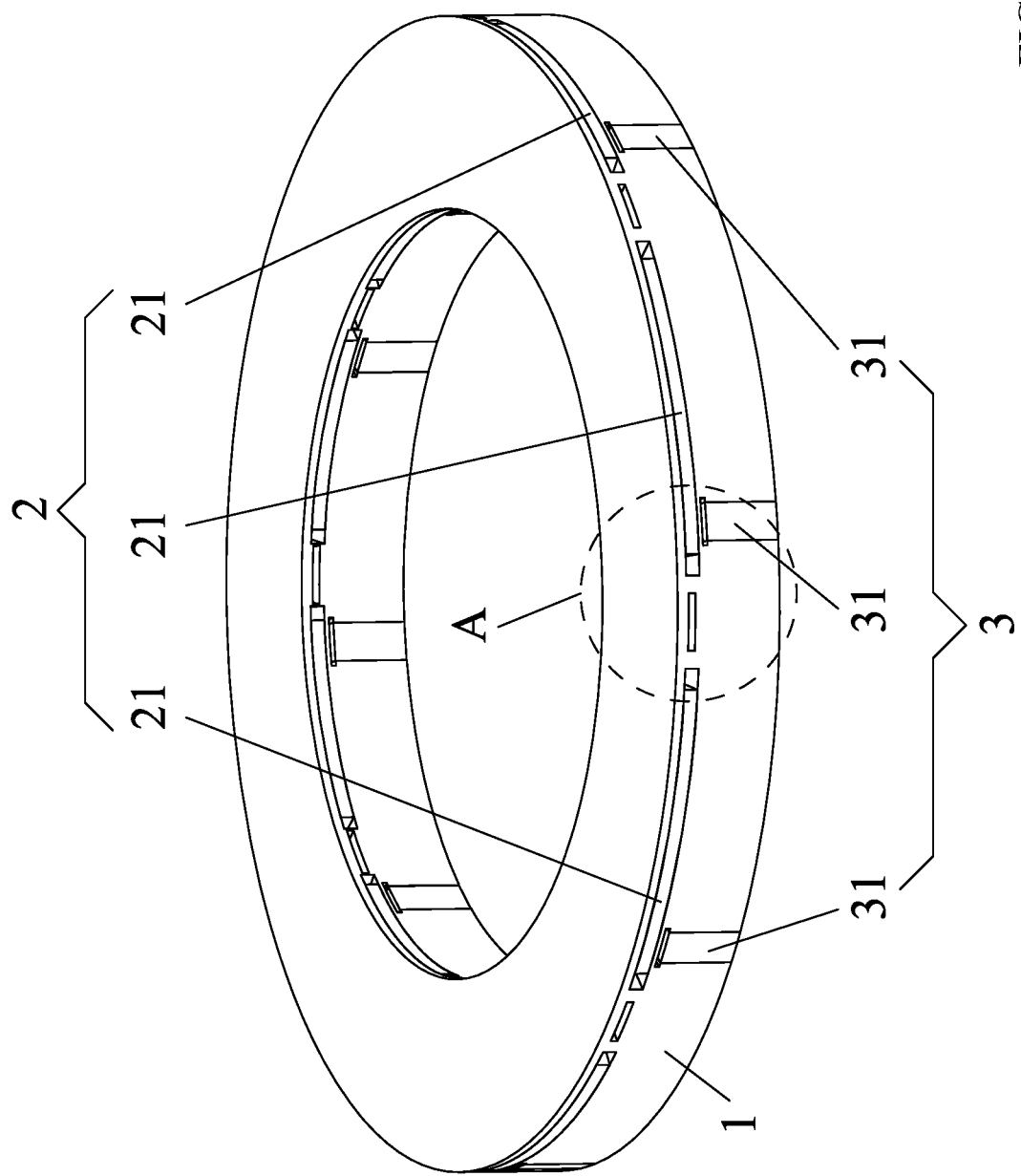
FIG. 6 is a perspective view of a rotor assembly according to one example of the disclosure.
Figure 7:
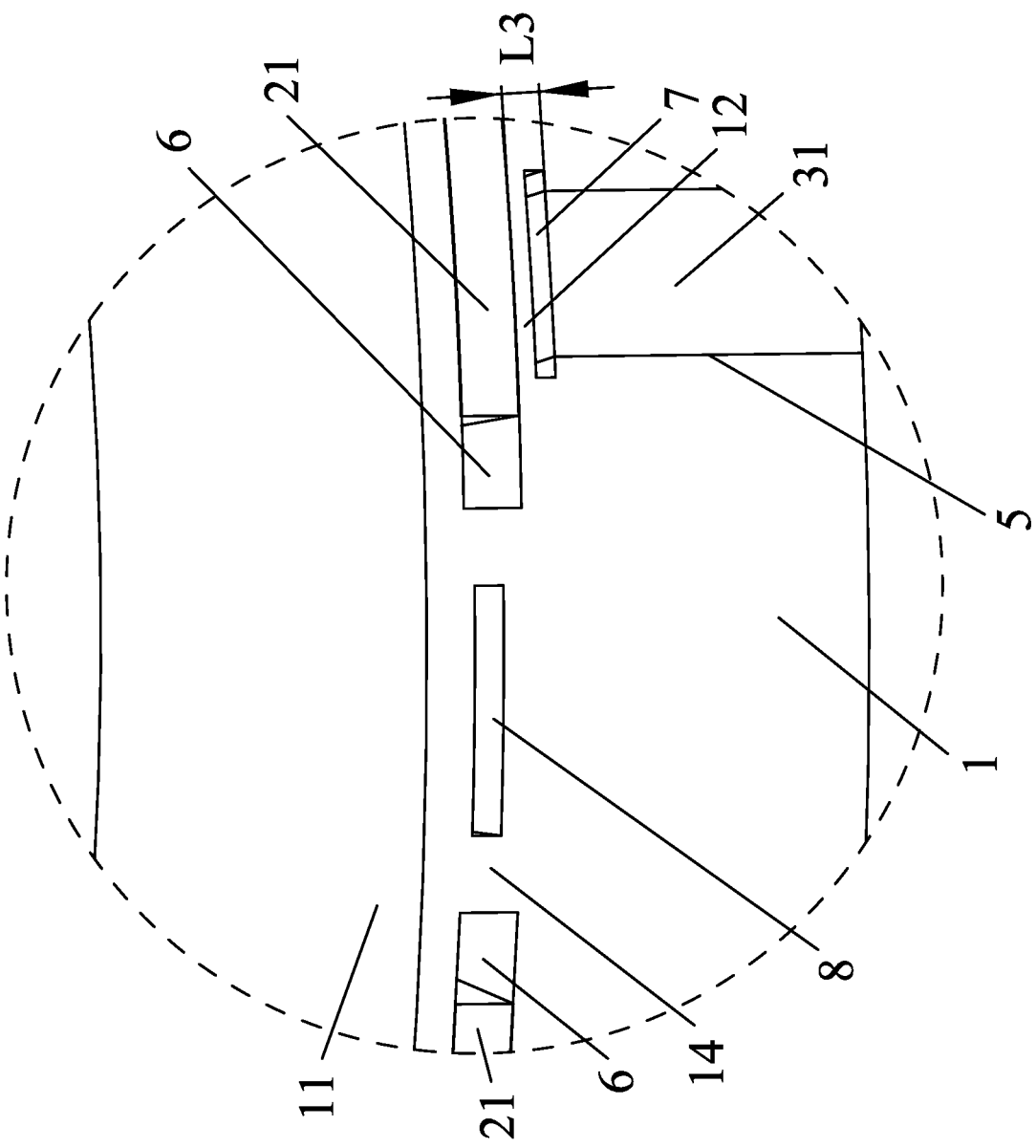
FIG. 7 is a local enlarge view of part A in FIG. 6.

As shown in FIGS. 5 to 7, the rotor core 1 comprises a first annular end plate 11, a second annular end plate 12, a plurality of iron block portions 13, and a plurality of connecting portions 14. The plurality of connecting portions 14 is disposed along the circumference between the first annular end plate 11 and the second annular end plate 12 to connect the first annular end plate 11 and the second annular end plate 12 together. A first mounting slot 4 is formed between every two adjacent connecting portions 14. Each first magnetic tiles 21 is inserted into the corresponding first mounting slot 4. The plurality of the iron block portions 13 are uniformly distributed and protrudes along the circumference from the bottom part of the second annular end plate 12. A second mounting slot 5 is formed between every two adjacent iron block portions 13. Each second magnetic tiles 31 is inserted into the corresponding second mounting slot 5. The rotor core 1 is a single piece of raw material, such as steel, cast iron, or SMC.

In a preferred embodiment of the disclosure, as shown in FIG. 7, a first air-gap magnetic barrier 6 is formed between each of the two sides of the first magnetic tile 21 and the adjacent connecting portion 14; and a second air-gap magnetic barrier 7 is formed between each of the first magnetic tiles 21 and a top of the second mounting slot 5; each of the connecting portions 14 comprises a through hole extending radially along the rotor core 1; the through hole functions as a third air-gap magnetic barrier 8; the first air-gap magnetic barrier, the second air-gap magnetic barrier, and the third air-gap magnetic barrier work together to effectively minimize the magnetic leakage.

In a preferred embodiment of the disclosure, assuming the motor comprises eight poles, the first set of magnetic tiles 2 comprises eight first magnetic tiles 21 evenly disposed along the first circumference, and the second set of magnetic tiles 3 comprises eight second magnetic tiles 3 evenly disposed along the second circumference. In this configuration, the offset angle α ranges between 6°-7°, and can be obtained through simulation experiments or mathematical model calculations. Additionally, when the maximum values of the permanent magnet torque and the reluctance torque occur, the electrical angle difference corresponds to the current angles is between 7.5°-12.5°. Specific parameter selections and simulation results are referred to Table 1.

TABLE 1

Parameter selections and simulation results

| Parameters | Before offset of second magnetic tile | After offset of second magnetic tile |
| --- | --- | --- |
| Number of motor slots | 12 | 12 |
| Number of poles on motor | 8 | 8 |
| Motor speed | 3600 RPM | 3600 RPM |
| Outer diameter of motor | 240 mm | 240 mm |
| Inner diameter of motor | 160 mm | 160 mm |
| Height of stator core | 55.5 | 55.5 |
| Height of rotor core | 23 | 23 |
| Thickness of first magnetic tile | 3 mm | 3 mm |
| Pole-arc coefficient of first magnetic tile | 0.8 | 0.8 |
| Thickness of second magnetic tile | 17 mm | 17 mm |
| Offset angle α | 0° | 6.7° |
| Current angle for maximum torque on permanent magnet | 0° | Approx. 10° |
| Current angle for maximum reluctance torque | Approx. 45° | Approx. 20° |

TABLE 1-continued

Parameter selections and simulation results

| Parameters | Before offset of second magnetic tile | After offset of second magnetic tile |
| --- | --- | --- |
| Difference in current angle between maximum values of permanent magnet torque and reluctant torque | Approx. 45° | Approx. 10° |

When the motor has 8 poles and the offset angle is 6.7°, the maximum torque on the permanent magnet occurs at an electrical angle of 10°, whereas the maximum reluctance torque occurs at an electrical angle of 20°. The difference in current angles between the maximum values of torque on the permanent magnet and reluctance torque is 10°, which is smaller than that when the second magnetic tile 31 is not offset. Consequently, the intervals of the larger values of permanent magnet torque and reluctance torque overlap more, which enhances the maximum electromagnetic torque that is combined by the permanent magnet torque and the reluctance torque. In other words, the maximum electromagnetic torque is increased after offset; and the motor can obtain a higher maximum electromagnetic torque when using control algorithms such as MTPA (maximum torque per ampere), so that the torque density of the motor is increased.

Figure 12:
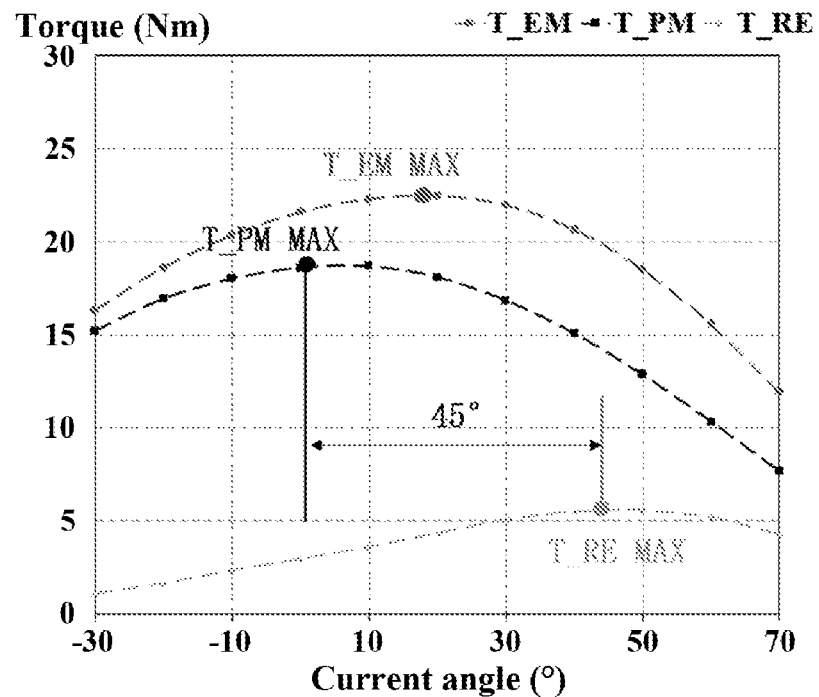
FIG. 12 is a torque component diagram of second magnetic tiles without offset (where the motor comprises eight poles) according to one example of the disclosure.

When the motor comprises eight poles, a torque component diagram without offset of the second magnetic tiles is shown in FIG. 12.

Figure 13:
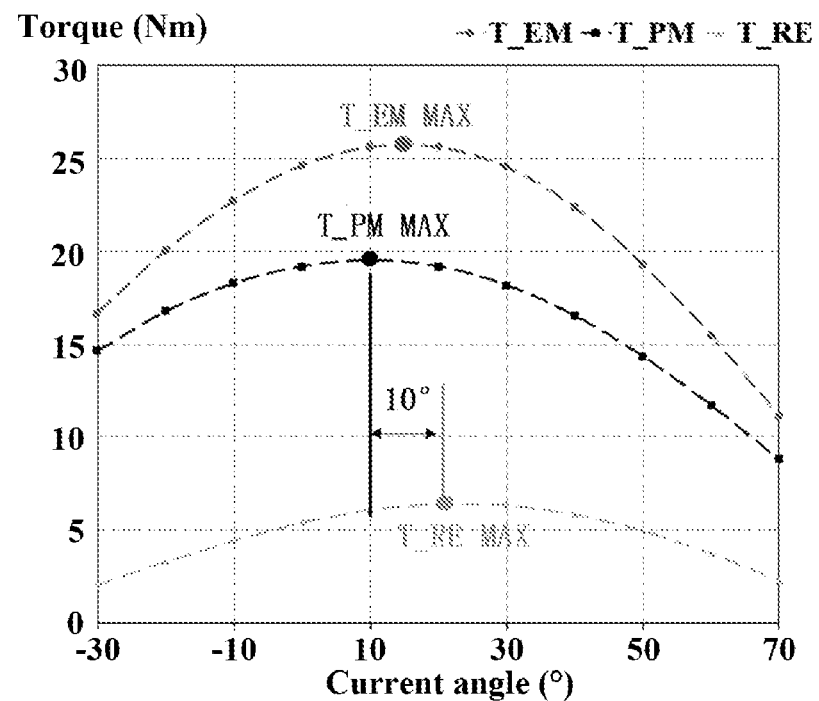
FIG. 13 is a torque component diagram of second magnetic tiles with offset (where the motor comprises eight poles) according to one example of the disclosure.

When the motor comprises eight poles, a torque component diagram with offset of the second magnetic tiles is shown in FIG. 13.

In FIGS. 10-13, T_PM MAX represents the maximum value of the component of the torque on the permanent magnet, T_RE MAX represents the maximum value of the component of the reluctance torque; T_EM MAX represents the maximum value of the total electromagnetic torque of the motor obtained by synthesizing the maximum values T_PM MAX of the component of the torque on the permanent magnet and the maximum value T_RE MAX of the component of the reluctance torque.

It will be obvious to those skilled in the art that changes and modifications may be made, and therefore, the aim in the appended claims is to cover all such changes and modifications.

What is claimed is:

1. A disc motor, comprising:
   a stator assembly; and
   a rotor assembly, the rotor assembly comprising a rotor core, a first set of magnetic tiles, and a second set of magnetic tiles;
   wherein:
   the stator assembly is coupled to the rotor assembly through an axial magnetic field;
   the first set of magnetic tiles is disposed on the rotor core along a first circumference and magnetized;
   the second set of magnetic tiles is disposed on the rotor core along a second circumference and magnetized tangentially;
   the first set of magnetic tiles is disposed near the stator assembly, and the second set of magnetic tiles is disposed away from the stator assembly;
   the first set of magnetic tiles is axially staggered with the second set of magnetic tiles at a distance of L3;

the first set of magnetic tiles comprises N first magnetic tiles disposed uniformly along the first circumference, and the second set of magnetic tiles comprises N second magnetic tiles disposed uniformly along the second circumference, where N is an integer;

a first centerline L1 is formed between every two adjacent first magnetic tiles, and each second magnetic tile comprises a second centerline L2; the first centerline L1 is offset from the second centerline L2 in a circumferential direction, which reduces an electrical angle difference between a first current angle corresponding to a maximum permanent magnet torque and a second current angle corresponding to a maximum reluctance torque, thereby increasing a maximum output torque of the disc motor;

the first centerline L1 is offset from the second centerline L2 in the circumferential direction by an offset angle $\alpha$;

each first magnetic tile has a cross section in the shape of a sector, and each second magnetic tile has a square cross section;

the rotor core comprises a first annular end plate, a second annular end plate, a plurality of iron block portions, and a plurality of connecting portions; the plurality of connecting portions is evenly disposed along a circumference between the first annular end plate and the second annular end plate to connect the first annular end plate and the second annular end plate together; a first mounting slot is formed between every two adjacent connecting portions; each first magnetic tile is inserted into a corresponding first mounting slot; and the plurality of the iron block portions are uniformly disposed and protrudes along the circumference from a bottom part of the second annular end plate; a second mounting slot is formed between every two adjacent iron block portions; and each second magnetic tile is inserted into a corresponding second mounting slot.

2. The disc motor of claim 1, wherein a first air-gap magnetic barrier is formed between each of two sides of the first magnetic tile and an adjacent connecting portion; and a second air-gap magnetic barrier is formed between each of the first magnetic tiles and a top of the second mounting slot.

3. The disc motor of claim 2, wherein each of the connecting portions comprises a through hole extending radially along the rotor core; and the through hole functions as a third air-gap magnetic barrier.

4. The disc motor of claim 3, wherein the first set of magnetic tiles comprises eight first magnetic tiles evenly disposed along the first circumference, and the second set of magnetic tiles comprises eight second magnetic tiles evenly disposed along the second circumference.

5. The disc motor of claim 4, wherein the offset angle $\alpha$ ranges between 6°-7°; and the electrical angle difference between the first current angle corresponding to the maximum permanent magnet torque and the second current angle corresponding to the maximum reluctance torque is between 7.5°-12.5°.

* * * * *